(12) United States Patent
Burton et al.

(10) Patent No.: US 10,145,191 B2
(45) Date of Patent: Dec. 4, 2018

(54) MODULAR WASTE PROCESSING SYSTEM

(71) Applicant: M-I L.L.C., Houston, TX (US)

(72) Inventors: Philip David Burton, Katy, TX (US); Gary Gray, Aberdeen (GB); Gary Rendall, Aberdeen (GB)

(73) Assignees: M-I Drilling Fluids UK Ltd, Aberdeen (GB); M-I L.L.C., Houston, TX (US)

( * ) Notice: Subject to any disclaimer, the term of this patent is extended or adjusted under 35 U.S.C. 154(b) by 0 days.

(21) Appl. No.: 14/890,509

(22) PCT Filed: May 15, 2013

(86) PCT No.: PCT/US2013/041134
§ 371 (c)(1),
(2) Date: Nov. 11, 2015

(87) PCT Pub. No.: WO2014/185901
PCT Pub. Date: Nov. 20, 2014

(65) Prior Publication Data
US 2016/0090798 A1 Mar. 31, 2016

(51) Int. Cl.
*A47G 19/00* (2006.01)
*E21B 21/06* (2006.01)
*B09B 5/00* (2006.01)
*B09C 1/00* (2006.01)

(52) U.S. Cl.
CPC .............. *E21B 21/065* (2013.01); *B09B 5/00* (2013.01); *B09C 1/00* (2013.01); *E21B 21/06* (2013.01)

(58) Field of Classification Search
CPC ......... E21B 21/065; E21B 21/06; B09C 1/00; B09B 5/00; B65D 21/0204; B65D 21/0201; B65D 21/02; B65D 21/0209
USPC .......... 220/4.26, 503–513, 4.01, 4.27, 23.83, 220/23.86, 908, 908.1–908.3, 909–911; 248/150, 146; 206/499, 501, 503; 414/403–410; 232/1 R, 1 E
See application file for complete search history.

(56) References Cited

U.S. PATENT DOCUMENTS

| | | | | |
|---|---|---|---|---|
| 2,030,612 | A * | 2/1936 | Sturtevant | B07B 4/025 209/139.2 |
| 2,833,421 | A * | 5/1958 | Skubic | A47B 47/027 182/178.5 |
| 3,138,398 | A * | 6/1964 | Silverman | B65D 90/0026 108/55.1 |
| 3,809,234 | A * | 5/1974 | Kurick | B65D 85/48 206/386 |
| 3,830,380 | A * | 8/1974 | Spencer | E04G 21/16 206/321 |
| 4,266,678 | A | 5/1981 | Daly | |
| 4,836,421 | A | 6/1989 | Miyoshi et al. | |
| 5,154,661 | A * | 10/1992 | Higgins | F25B 21/02 62/3.2 |
| 5,267,663 | A * | 12/1993 | Dykhouse | B65D 19/44 206/501 |

(Continued)

*Primary Examiner* — Kareen K Thomas
(74) *Attorney, Agent, or Firm* — Paula B. Whitten

(57) ABSTRACT

A waste processing system includes a lower tank portion coupled to a first support frame with a guiding member. The waste processing system further includes an upper tank portion coupled to a second support frame, the second support frame including a leg defining a hole for receiving the guiding member to align the first support frame with the second support frame.

17 Claims, 6 Drawing Sheets

(56) References Cited

U.S. PATENT DOCUMENTS

| | | | | | |
|---|---|---|---|---|---|
| 5,378,370 | A | * | 1/1995 | Brane | B01J 49/0086 210/269 |
| 5,465,988 | A | * | 11/1995 | Dennis | A47B 5/02 220/23.83 |
| 6,588,616 | B1 | * | 7/2003 | Ho | B02C 18/0007 220/4.03 |
| 7,208,858 | B2 | | 4/2007 | Manchester et al. | |
| 7,321,096 | B1 | * | 1/2008 | Huang | G03B 17/02 174/135 |
| 7,997,213 | B1 | | 8/2011 | Gauthier et al. | |
| 8,668,107 | B2 | * | 3/2014 | Decker | B65F 1/006 220/500 |
| 8,857,634 | B2 | * | 10/2014 | Harris | B65D 19/08 108/53.1 |
| 8,875,894 | B2 | * | 11/2014 | Ness | B65G 1/02 108/55.3 |
| 2005/0092637 | A1 | * | 5/2005 | Baechle | B65D 5/006 206/386 |
| 2006/0266747 | A1 | * | 11/2006 | Stolzman | B65D 19/18 220/4.26 |
| 2010/0218469 | A1 | * | 9/2010 | Radaelli | B01D 46/0013 55/378 |
| 2011/0278305 | A1 | * | 11/2011 | Chun | B65D 90/52 220/563 |
| 2012/0090277 | A1 | * | 4/2012 | Martheenal | B65D 21/0216 53/474 |

* cited by examiner

MODULAR WASTE PROCESSING SYSTEM

BACKGROUND

This section provides background information related to the present disclosure and is not necessarily prior art.

In the drilling of wells, a drill bit is used to dig thousands of feet into the earth's crust. Fluid (e.g., "drilling mud," "drilling fluid," etc.) is pumped from a well drilling platform, through a drill string, to the drill bit at the lower or distal end of drill string. The drilling mud serves to lubricate the drill bit and carry away well cuttings generated by the drill bit as it engages rock and underground formations. The cuttings are carried in a return flow stream of drilling mud through an annulus of the well and back to the well drilling platform at the earth's surface. When the drilling mud reaches the platform, it is contaminated with debris, such as pieces of shale and rock, known in the industry as well cuttings or drill cuttings. Once the drill cuttings, drilling mud, and other waste reach the platform, various processing operations may be employed. The remaining drill cuttings, waste and residual drilling mud (e.g., "drilling waste," "waste", etc.) may be transported via a transporting vessel to a disposal site.

Alternatively, waste produced by the drilling operations may be processed and re-injected back into the formation from which the material came. Prior to re-injection, waste is processed through a waste processing system that turns the materials into a slurry that can be pumped deep underground and injected into a processing site.

Many drilling sites are located in remote locations and relatively inaccessible locations where transportation infrastructure is limited or nonexistent. Therefore, in some instances, the waste is transported to an offsite waste processing facility. However, transporting the waste products offsite can be expensive and/or hazardous.

Alternatively, waste processing systems may be transported via various means, such as by helicopter, to drilling sites. However, typical waste processing systems, having multiple tanks, pump, or other components, may be excessive in weight, thus presenting challenges in the transportation of such processing systems. Accordingly, it is desirable to efficiently transport and assemble waste processing systems at drilling sites.

SUMMARY

This section provides a general summary of the disclosure, and is not a comprehensive disclosure of its full scope or all of its features.

In one aspect, a waste processing system includes a lower tank portion coupled to a first support frame coupled to a guiding member. The system also includes an upper tank portion coupled to a second support frame including a leg defining a hole for receiving the guiding member to align the first support frame with the second support frame.

In another aspect, a waste processing system is disclosed. The system includes a lower tank portion coupled to a first support frame defining a guiding member and an upper tank portion coupled to a second support frame, the second support frame including a leg defining a hole for receiving the guiding member. The support frame defines an eyelet for receiving a cable to transport the tank portion. The system further includes a gasket disposed between and sealingly engaging the lower tank portion to the upper tank portion.

In yet another aspect, a method includes providing a lower tank portion of a waste processing system, wherein the lower tank portion is coupled to a first support frame defining a guiding member. The method also includes providing an upper tank portion of the waste processing system, wherein the upper tank portion is coupled to a second support frame including a leg defining a hole. The method further includes removably securing the lower tank portion to the upper tank portion by aligning the hole to receive the guiding member.

Further areas of applicability will become apparent from the description provided herein. The description and specific examples in this summary are intended for purposes of illustration only and are not intended to limit the scope of the present disclosure.

Furthermore, modifications are possible without materially departing from the teachings of the present disclosure. Accordingly, such modifications are intended to be included within the scope of the disclosure as defined in the claims.

DRAWINGS

The drawings described herein are for illustrative purposes only of selected embodiments and not all possible implementations, and are not intended to limit the scope of the present disclosure. For a more complete understanding of the present disclosure, reference should be made to the following detailed description, taken in conjunction with the accompany drawings, in which.

Corresponding reference numerals indicate corresponding parts throughout the several views of the drawings.

DETAILED DESCRIPTION

Figure 1:
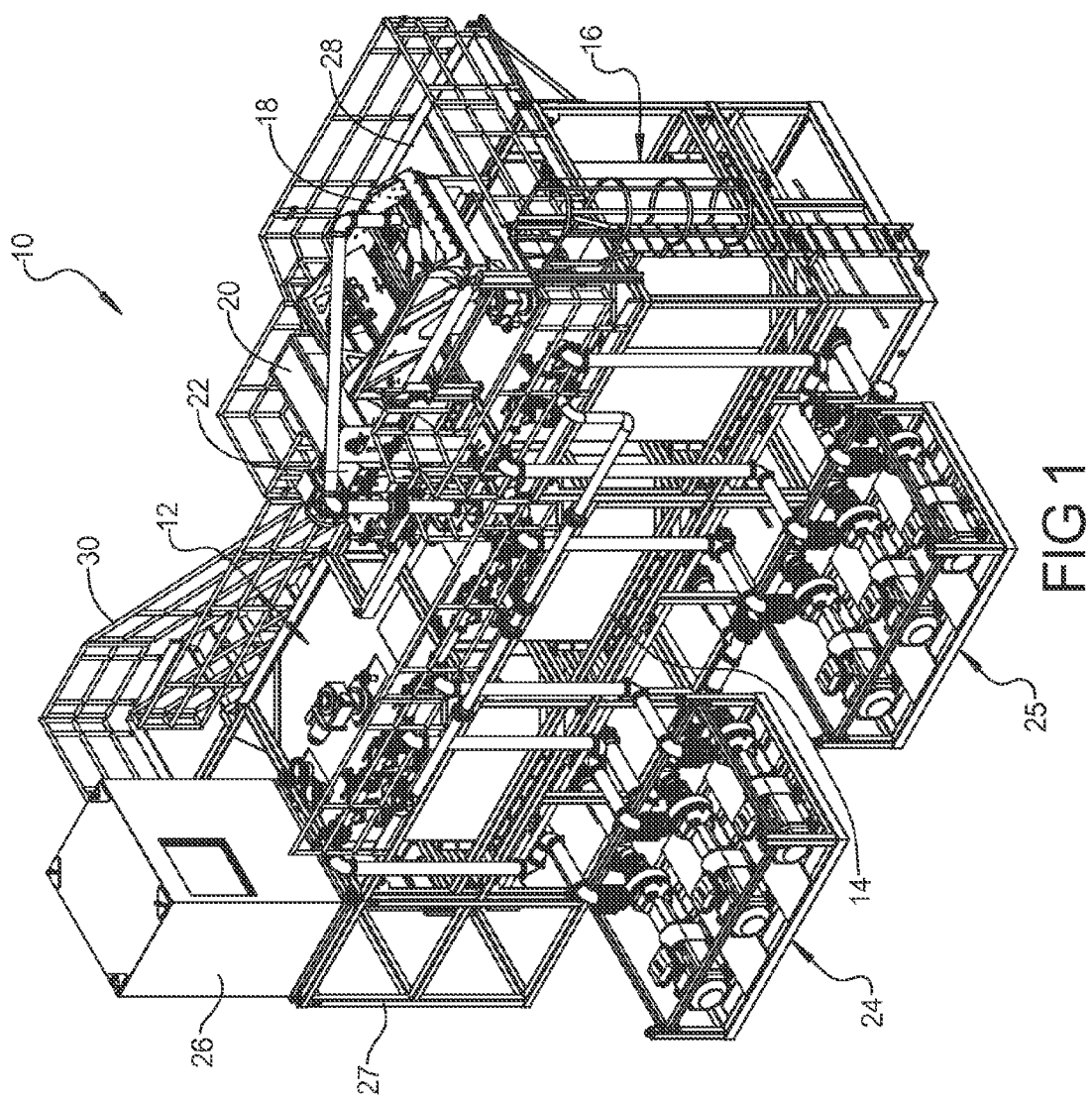
FIG. 1 is a perspective view of a waste processing system in a fully assembled configuration according to principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, components, and/or groups, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the drawings. Spatially relative terms may be intended to encompass different orientations of the device in use or operation in addition to the orientation depicted in the drawings. For example, if the device in the drawings is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
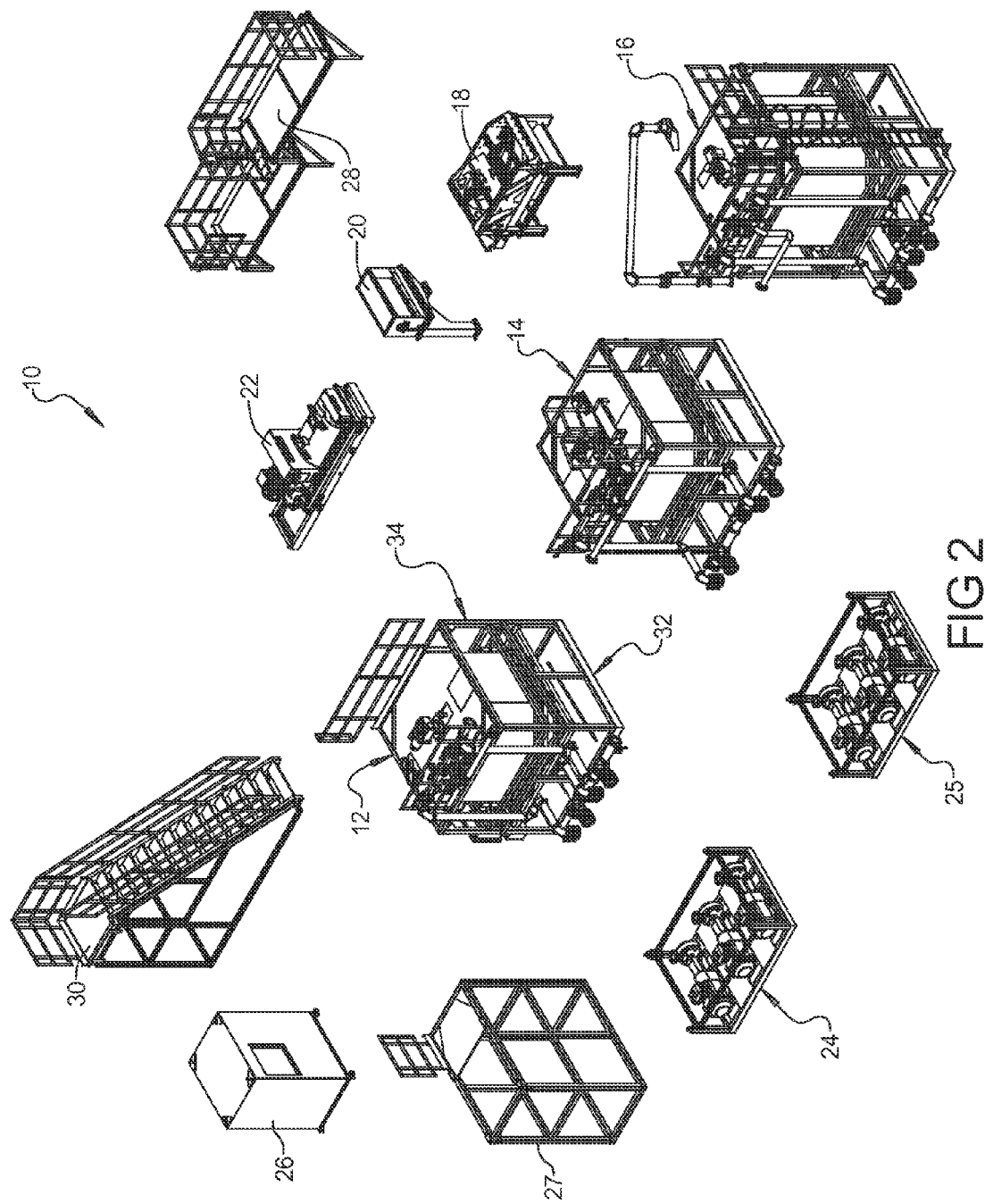
FIG. 2 is a partially exploded view of the waste processing system of FIG. 1.

Referring initially to FIG. 1 and FIG. 2, a waste processing system 10, shown respectively in an assembled configuration and a partially exploded view, is shown according to principles of the present disclosure. For purposes of this disclosure, a waste processing system may include an instrumentality or aggregate of instrumentalities operable to receive, process, breakdown, and/or store waste, such as from a drilling site. The waste processing system 10 may include a coarse tank 12, a fine tank 14, a holding tank 16, a classification shaker 18, a shaker discharge hopper 20, a grinding mill 22, a first pump module 24, a second pump module 25, a control room 26, a control-room-support structure 27, a walkway 28, and/or an access stairway 30. The waste processing system 10 may be modular, such that each of the above components may be separated from the waste processing system 10 into one or more modules or units to facilitate transportability of all or some components of the waste processing system 10, such as to a drilling site.

As discussed below, each of the tanks 12, 14, 16 may be separated into two or more modules to allow for transport by a relatively small helicopter, for example. Those of ordinary skill in the art will appreciate that additional components may be added to the waste processing system 10 or may operate independently, and still be considered a component of the waste management system 10.

As will be subsequently described, each of the modules may include structure (e.g., anchors and/or eyelets for attaching lifting cables) to allow the modules to be lifted and/or transported via transporter (e.g., helicopter, crane, boat, train, truck). Moreover, the modules may be provided with structure to facilitate assembly of the modules at remote drilling sites with limited manpower and/or equipment.

Figure 3:
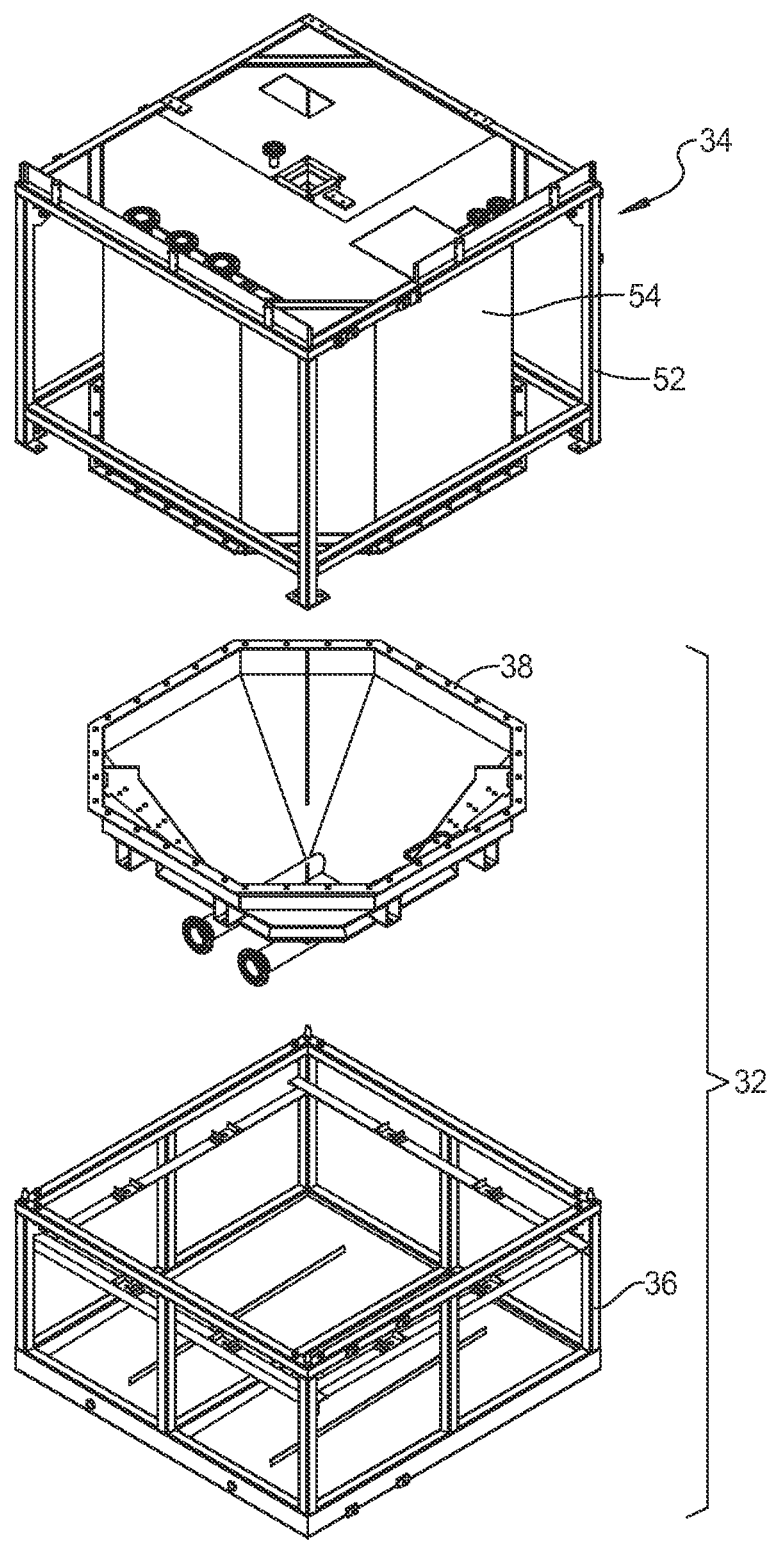
FIG. 3 is a partially exploded view of a lower tank portion and an upper tank portion of the waste processing system of FIG. 1.

Turning now to FIG. 3, a partially exploded view of a lower tank 38 portion and an upper tank portion 54 of the coarse tank 12, one component of the waste processing system 10, is shown. The coarse tank 12 may be a vessel for receiving, processing, or storing waste. Although described with respect to a waste vessel, those skilled in the art will appreciate that any vessel or tank located near a drilling site for performing a specialized drilling operation may be integrated into the systems and methods disclosed herein. The coarse tank 12 may include an upper module 34, a lower module 32, and a lower support frame 36. The upper tank portion 54 and lower tank portion 38 may be in communication such as to allow the transference of fluids and/or waste therebetween.

Figure 4:
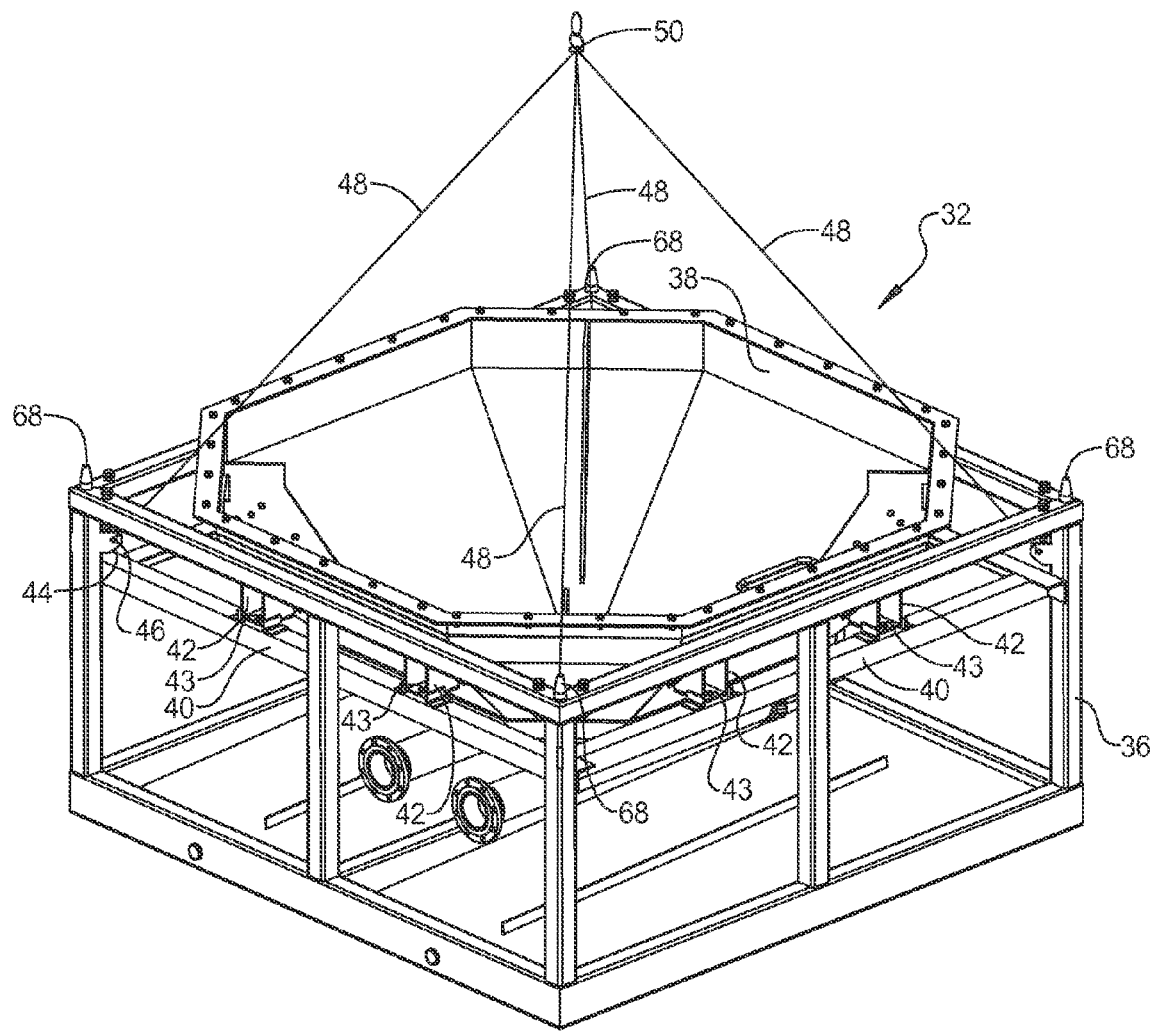
FIG. 4 is a perspective view of a lower tank portion of the waste processing system of FIG. 1 in a transport configuration according to principles of the present disclosure.

Moving to FIG. 4, a perspective view of a lower module 32 in a transport configuration is shown. The lower tank portion 38 may be coupled to a lower support frame 36 which may include crossbeams 40. The lower tank portion 38 may include at least one bracket assembly 42 coupled to the crossbeams 40. The bracket assembly 42 may receive a fastener 43, such as a bolt, screw, or the like, to secure the lower tank portion 38 to the lower support frame 36 when the lower tank portion 38 is in a transport configuration (as shown in FIG. 4).

The lower support frame 36 may also include a plurality of anchor flanges 44, each of which may be disposed in a corresponding corner of the lower support frame 36, for example. Each anchor flange 44 may include an eyelet 46 that may engage and/or receive a corresponding cable 48. The cables 48 may be attached to a cable bracket 50, which in turn can be attached to or lifted by a transporter, such as a helicopter, crane hoist, or the like. In this manner, the transporter can lift the lower module 32 by the cables 48 and transport the lower module 32 to a desired location. In one embodiment, the support frame 36 may define the eyelet for receiving the cable to transport the tank portion 38. In some embodiments, the lower tank portion 38 may have a weight of 3.5 tons (3500 kilograms) or less, thereby enabling the lower tank portion 38 to be lifted and transported via a small transporter, such as a small helicopter. Thus, the support frame serves to protect the tank portion while providing a point of attachment for the cables 48 to allow for transport of same.

Figure 5:
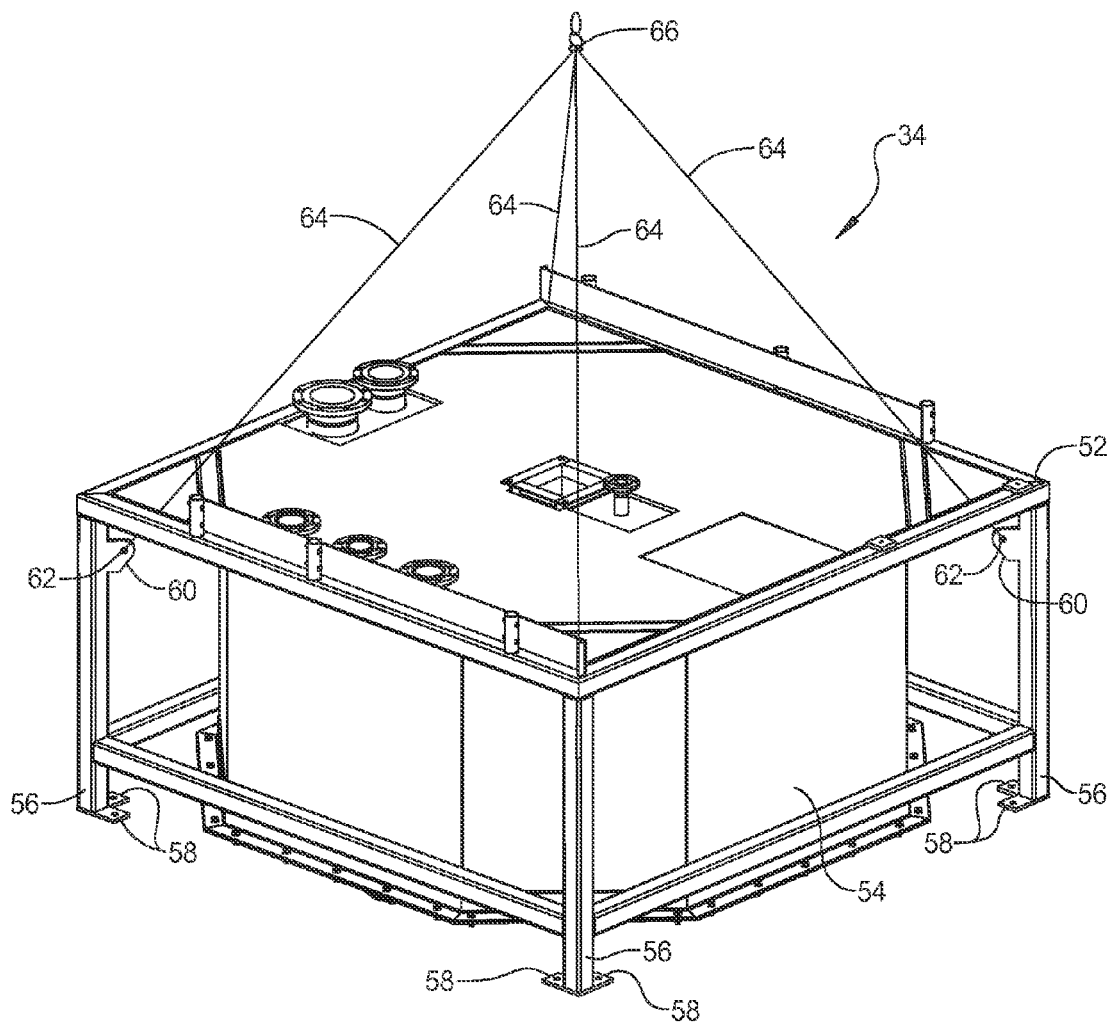
FIG. 5 is a perspective view of an upper tank portion of the waste processing system of FIG. 1 in a transport configuration according to principles of the present disclosure.

Referring now to FIG. 5, the upper module 34 may include an upper support frame 52 and an upper tank portion 54. The support frame 52 may include legs 56 having mounting brackets 58 that are attachable to the support frame 36 of the lower module 32 during assembly of the waste processing system 10 at a drilling site. The upper tank portion 54 may be welded or otherwise fixedly attached to the upper support frame 52.

The upper support frame 52 may also include a plurality of anchor flanges 60, each of which may be disposed in a corresponding corner of the upper support frame 52, for example. Each anchor flange 60 may include an eyelet 62 that may engage a corresponding cable 64. Similar to the cables 48 described above, the cables 64 may be attached to a cable bracket 66 which in turn can be attached to or lifted by a transporter such as a helicopter, crane hoist, or the like. In this manner, the transporter can lift the upper module 34 by the cables 64 and transport the upper module 34 to a desired location. In some embodiments, the upper tank portion 54 may have a weight of 3.5 tons (3500 kilograms) or less, thereby enabling the upper tank portion 54 to be lifted and transported via small transporter, such as a small helicopter.

After the lower and upper modules 32, 34 have been transported to a drilling site via transporter, the lower module 32 and upper module 34 can be assembled to each other. First, the lower tank portion 38 may be placed in a desired location. Then the fastener 43 may be removed from the bracket assembly 42 of the lower tank portion 38. This may allow at least some amount of movement of the lower tank portion 38 relative to the support frame 36. The upper module 34 may then be lowered onto the lower module 32 so that the legs 56 of the support frame 52 of the upper module 34 may rest on and be fastened to the support frame 36 of the lower module 32. The support frame 36 of the lower module 32 may include guiding members 68 that can be received in corresponding holes (not shown) in the legs 56 of the support frame 52 of the upper module 34. The guiding members 68 may take the form of a dowel, rod, or the like and may have any shape (e.g., cylindrical, tapering) to be received by the holes of the support frame leg. Insertion of the guiding members 68 into the holes of the upper module support frame may facilitate alignment of the support frames 36, 52 relative to each other.

Figure 6:
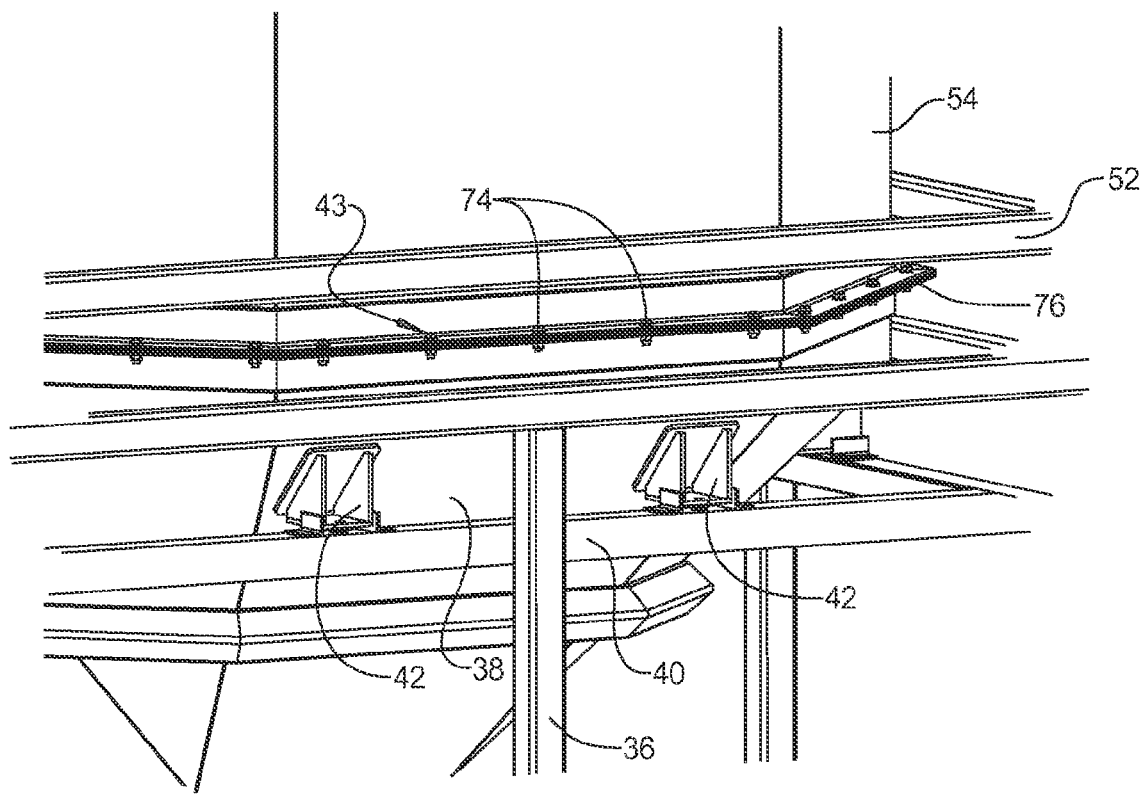
FIG. 6 is a partial perspective view of the upper and lower tank portions in an assembled configuration according to principles of the present disclosure.

With the support frame 52 of the upper module 34 fastened to the support frame 36 of the lower module 32, the lower tank portion 38 may be moved relative to the support frames 36, 52 and the upper tank portion 54. The lower tank portion 38 may further be aligned relative to the upper tank portion 54 so that mounting apertures (not shown) extending through flanges 44, 60 of the lower tank portion 38 and upper tank portion 54, respectively, are substantially aligned. With the lower tank portion 38 and upper tank portion 54 aligned, fasteners 43 may be inserted through the mounting apertures 74 to securely fasten the lower tank portion 38 relative to the upper tank portion 54, as shown in the assembled configuration of FIG. 6. If fasteners 43 are removed from the bracket assembly 42, the lower tank portion 38 may no longer be engaged with (i.e., movable with respect to) the support frame 36. Thus, tightening of the fasteners 43 through the mounting apertures 74, to achieve an assembled configuration, may slightly raise the lower tank portion 38 away from the support frame 36 and toward the upper tank portion 54.

A gasket 76 or other sealing material may be provided between the lower tank portion 38 and upper tank portion 54 to prevent fluid from leaking therebetween during operation of the waste processing system 10. In one embodiment, an oil resistant soft seal may provide a watertight seal around the horizontal split between the upper tank portion 54 and the lower tank portion 38. Tightening the fasteners 43 may compress the gasket 76 to contact and engage both the lower and upper tank portions 38, 54.

It will be appreciated that one or both of the fine tank 14 and the holding tank 16 of the waste processing system 10 may be separated into upper and lower tank portions to facilitate transportability, as described above. Furthermore, such upper and lower tank portions may be configured and assembled in substantially the same manner as described above. Some or all of the pipes, pumps, electronic components and/or other sensitive equipment of the waste processing system 10 may be provided with shock absorbing and/or shock resistant structures so that these components may withstand shock loading often associated with transportation.

After transporting the coarse tank 12, the fine tank 14, the holding tank 16, the classification shaker 18, the shaker discharge hopper 20, the grinding mill 22, the first pump module 24, the second pump module 25, the control room 26, the control-room-support structure 27, the walkway 28, and/or the access stairway 30 to the drilling site, the above components can all be assembled together to form the waste processing system 10. It will be appreciated that various components can be assembled together while other components are still in transit. It will also be appreciated that the modules of the waste processing system 10 can be assembled and disassembled multiple times for multiple uses at various oil drilling sites.

After assembly of the waste processing system 10 at a drilling site, the waste processing system 10 may be operated to treat cuttings that are collected during drilling. As one non-limiting example of a use of the waste processing system 10, oil or water based cuttings may be deposited into a component (e.g., coarse tank 12) of the waste processing system 10. Water may be added to the coarse tank 12, as appropriate. The contents of the coarse tank 12 may be agitated and circulated through the coarse tank 12 using pumps, shown herein as part of the first and/or second pump modules 24, 25 until the contents form a slurry that is transferred to the fine tank 14 for further conditioning and breakdown of solid particles.

The contents of the fine tank 14 may be agitated and circulated using pumps of the first and/or second pump modules 24, 25. After an adequate amount of processing in the fine tank 14, the slurry may be transferred to the classification shaker 18 which may separate large solids from the fluid. The large solids may then be discharged from the classification shaker 18 to the grinding mill 22 and then back into the fine tank 14 for further conditioning. Fluids from the classification shaker 18 may be pumped to the holding tank 16 for storage and/or subsequent re-processing and/or re-injection into the formation.

As previously mentioned, the transporting of drilling waste products, such as cuttings, offsite may be costly and dangerous. Thus, embodiments disclosed herein may provide apparatus and methods for the processing of drilling waste to be transported and assembled with relative ease. Apparatus and systems discussed herein provide for the transport of upper tank portions and lower tank portions of waste processing systems and as such, these units relatively small in size, may prevent the need for costly and potentially dangerous lifting operations. Furthermore, components of the waste processing system mentioned previously may form a complete system with minimal requirements for drill site rigging-up or rigging-down.

The foregoing description of the embodiments has been provided for purposes of illustration and description. Although the preceding description has been described herein with reference to particular means, materials, and embodiments, it is not intended to be limited to the particulars disclosed herein; rather, it extends to all functionally equivalent structures, methods, and uses, such as are within the scope of the appended claims.

What is claimed is:

1. A waste processing system comprising:
   a lower tank portion coupled to a first support frame, wherein the first support frame is coupled to a guiding member;
   an upper tank portion coupled to a second support frame, the second support frame including a leg defining a hole for receiving the guiding member to align the first support frame with the second support frame,
   a bracket assembly coupled to the lower tank portion, the bracket assembly comprising a bracket frame and a fastener to secure the lower tank portion to the first support frame, and
   a gasket disposed between and sealingly engaging the upper tank portion and the lower tank portion.

2. The system of claim 1, wherein the fastener secures the lower tank portion to the upper tank portion when the system is in an assembled configuration.

3. The system of claim 1, wherein the lower tank portion is movable to compress the gasket engaging the upper tank portion and the lower tank portion when the system is in an assembled configuration.

4. The system of claim 1, wherein the lower tank portion is removably secured to the upper tank portion by aligning the guiding member within the hole.

5. The system of claim 1, wherein the guiding member is a tapering dowel.

6. A waste processing system comprising:
   a lower tank portion coupled to a first support frame defining a guiding member;
   an upper tank portion coupled to a second support frame, the second support frame including a leg defining a hole for receiving the guiding member,
   wherein at least one support frame selected from the first support frame and the second support frame defines an eyelet for receiving a cable; and
   a gasket disposed between and sealingly engaging the lower tank portion to the upper tank portion.

7. The system of claim 6 further comprising:
   a bracket assembly for receiving a fastener to fasten the lower tank portion to the first support frame when the system is in a transport configuration.

8. The system of claim 7, wherein the fastener secures the lower tank portion to the upper tank portion when the system is in an assembled configuration.

9. The system of claim 6, wherein the upper tank portion is in fluid communication with the lower tank portion.

10. The system of claim 6, wherein the guiding member is a tapering dowel.

11. A method comprising:
    providing a lower tank portion of a waste processing system, wherein the lower tank portion is coupled to a first support frame defining a guiding member;
    providing an upper tank portion of the waste processing system, wherein the upper tank portion is coupled to a second support frame including a leg defining a hole;
    removably securing the lower tank portion to the upper tank portion by aligning the hole to receive the guiding member;
    coupling a bracket assembly to the lower tank portion, the bracket assembly comprising a bracket frame and a fastener to fasten the lower tank portion to the first support frame when the system is in a transport configuration; and
    sealingly engaging the upper tank portion and the lower tank portion via a gasket disposed between the upper tank portion and the lower tank portion.

12. The method of claim 11 further comprising:
    securing the lower tank portion to the upper tank portion via the fastener when the waste processing system is in an assembled configuration.

13. The method of claim 12, further comprising:
    securing the lower tank portion to the upper tank portion via the fastener through a mounting aperture.

14. The method of claim 11, further comprising:
    raising the lower tank portion to compress the gasket engaging the upper tank portion with the lower tank portion when the waste processing system is in an assembled configuration.

15. The method of claim 11, wherein the guiding member is a tapering dowel.

16. The method of claim 12 further comprising:
    engaging a cable through an eyelet defined by an anchor flange coupled to at least one tank portion, selected from the lower tank portion and the upper tank portion, to lift the at least one tank portion via a transporter.

17. A method comprising:
    providing a lower tank portion of a waste processing system, wherein the lower tank portion is coupled to a first support frame defining a guiding member;
    providing an upper tank portion of the waste processing system, wherein the upper tank portion is coupled to a second support frame including a leg defining a hole;
    removably securing the lower tank portion to the upper tank portion by aligning the hole to receive the guiding member;
    coupling a bracket assembly to the lower tank portion, the bracket assembly comprising a bracket frame and a fastener to fasten the lower tank portion to the first support frame if the system is in a transport configuration; and
    engaging a cable through an eyelet defined by an anchor flange coupled to at least one tank portion, selected from the lower tank portion and the upper tank portion, to lift the at least one tank portion via a transporter.

* * * * *